United States Patent Office 3,433,738
Patented Mar. 18, 1969

3,433,738
METHOD OF PRECIPITATING POLYVALENT CATIONS
William A. P. Black, Falkirk, Eric T. Dewar, Dalkeith, and David Rutherford, Edinburgh, Scotland, assignors to the United States of America as represented by the Secretary of Agriculture
No Drawing. Application June 16, 1965, Ser. No. 527,998, now Patent No. 3,400,107, which is a division of application Ser. No. 225,168, Sept. 20, 1962, now Patent No. 3,225,012, which in turn is a continuation-in-part of application Ser. No. 140,618, Sept. 25, 1961. Divided and this application May 7, 1968, Ser. No. 739,955
U.S. Cl. 210—54                                1 Claim
Int. Cl. C02b 1/20, 5/00

ABSTRACT OF THE DISCLOSURE

Aqueous solutions of the sodium salt of poly(3-O-methacryloyl-D-gluconic acid) exhibit high viscosities and effectively precipitate polyvalent cations from solution. The preparation of the above polyacid via a subsequently deacetonated isopropylidene intermediate is described.

---

A nonexclusive, irrevocable, royalty-free license in the invention herein described, throughout the world for all purposes of the United States Government, with the power to grant sublicenses for such purposes, is hereby granted to the Government of the United States of America.

This application is a division of Ser. No. 527,998, filed June 16, 1965 (now U.S. Patent No. 3,400,107); which was a division of Ser. No. 225,168, filed Sept. 20, 1962 (now U.S. Patent No. 3,225,012); which in turn was a continuation-in-part of Ser. No. 140,618, filed Sept. 25, 1961 (now abandoned).

This invention relates to a method for precipitating divalent metal ions using a novel polymeric polymer having exceptional commercial promise. More particularly, our invention relates to an optically active polymethacrylate polymer containing substituted hexitol residues and more particularly residues of D-glucose, and the corresponding dicarboxylic acid residues, which polymethacrylate polymers are easily converted into a novel type of water-soluble methacrylate containing a hydrocarbon backbone having potential free aldehyde-containing glucose residues attached to every other carbon atom. This water-soluble polymethacrylate gives rise to derivatives of commercial promise by chemical treatment, for example by reduction, oxidation, acetylation, methylation, carbonilation, and phenylhydrazone and diphenylformazan formation. Our novel polymethacrylate may have advantages over natural glucose polymers, such as starch and cellulose, in being more reactive and less readily attacked by microrganisms.

EXAMPLE 1

1,2;5,6-di-O-isopropylidene-3-O-methacrylol-α-D-glucofuranose

Diisopropylideneglucose (20 g.) in dry pyridine (100 ml.) was heated at 65° C. for 3.5 hours with methacrylic anhydride (20 ml.); water (50 ml.) was then added, and the mixture was heated for a further hour with stirring. After standing overnight at 30° C., the reaction mixture was extracted with three 100 ml. portions of petroleum ether (B.P. 30–40°) and the petroleum extracts were washed with three 100 ml. portions of 5 percent sodium hydroxide solution, and then with water. The extracts were dride over sodium sulphate, tetrachlorohydroquinone (20 mg.) added, the solution concentrated, and the resulting syrup was distilled twice to give a pure monomeric product as a colorless, viscous syrup which slowly crystallized,
M.P. 34–35° C. The yield varied from 50 to 70 percent in different preparations. B.P. 120° C./0.20 mm. Hg; $n_D^{18}$ 1.4614; $[\alpha]_D^{25}$ −37.0° in ethanol, −40.0° in chloroform, and −32.2° in tetrachloroethane (c., 1). Analysis $C_{16}H_{24}O_7$ requires C, 58.51; H, 7.37; $CH_2\!=\!C(CH_3)CO$, 21.03%. Found C, 57.7; H, 7.22; $CH_2\!-\!(CH_3)CO$, 19.7. The monomer showed no OH absorption at 3,400 cm.$^{-1}$ in the infrared.

EXAMPLE 2

Poly(1,2;5,6-di-O-isopropylidene-3-O-methacryloyl-α-D-glucofuranose)

The pure monomer of Example 1 (40.84 g.) was polymerized in benzene (41 ml.) in a nitrogen atmosphere by heating at 70° C. for 24 hours in the presence of azobisisobutyronitrile (408 mg.). Further benzene (41 ml.) was then added and the acetonated polymer was precipitated by pouring the viscous solution into 2 liters of methanol with stirring. The solid was centrifuged redissolved in boiling benzene (80 ml.), and reprecipitated with 2 liters of methanol to give 31.21 g. (76.4% yield) of a white polymer with the following characteristics: M.P. 214–218° C.; $[\alpha]_D^{27}$ −47.6° in tetrachloroethane (c., 0.5). Analysis $(C_{16}H_{24}O_7)_n$ requires C, 58.51; H, 7.37%. Found: C, 58.32; H, 7.35. The inherent viscosity, $\eta_{inh.}\!=\!c.^{-1} \ln (\eta_{soln.}\, \eta_{solv.})$, of a solution of the polymer tetrachloroethane was 0.50 dl./g. (c., 0.5 g./100 ml.; 25° C.) The polymer was soluble in chlorinated hydrocarbons and benzene but insoluble in alcohol and water.

EXAMPLE 3

Poly(3-O-methacryloyl-D-glucopyranose)

20 g. of the polymer of Example 2 was hydrolyzed for 2 hours in 400 ml. of 1 N HCl at 100° with rapid stirring, the acetone being allowed to escape from the reaction flask. Insoluble material was removed at the centrifuge, wash with water, and the solution and washings neutralized with 4 N sodium hydroxide solution. The solution was dialyzed against tap-water overnight to remove chloride, filtered through Kieselguhr, the filtrate concentrated to 100 ml., and poured into 670 ml. ethanol. The polymer was separated by centrifugation, washed with ethanol and ether, and dried over $P_2O_5$ to a white powder (11.21 g.). Yield, 74.1%. $[\alpha]_D^3$ +49.8° in water (c., 0.5). The inherent viscosity was 0.42 in water Analysis $(C_{10}H_{16}O_7)_n$ requires C, 48.38; H, 6.50%. Found: C, 48.1; H, 6.39. The polymer was strongly reducing as the result of carbon atom 1 of the glucose residue being free.

EXAMPLE 4

Poly(3-O-methacryloyl-D-gluconic acid 508.5 mg. of the polymer of Example 3 was dissolved in 4 M acetic acid (25 ml.), M sodium chlorite (20 ml.) added, the solution made up to 50 ml., and the reaction allowed to proceed for 26 hr. at 20°. The solution was dialyzed against running water overnight to remove excess chlorite and acetic acid, concentrated to small volume, passed through an Amberlite resin IR–120–N column to remove cations from the polyacid, and the eluate and washings freeze-dried to give the polyacid as a white solid (491 mg.). Yield, 90.7%. The product contained 83.2% of the theoretical carboxyl content.

This polyacid was readily converted into its sodium salt. The above white solid (98.7 mg.) was dissolved in 0.01 M sodium hydroxide (50 ml.), the excess alkali neutralized exactly with 0.01 N sulphuric acid, and the solution dialyzed against distilled water to remove sodium sulphate. The filtered dialyzate was freeze-dried to give the sodium salt as a white solid (78 mg.). Yield, 73%. $[\alpha]_D$ +3° in water (c., 0.45). The inherent viscosity was 0.47 in water. Analysis $(C_{10}H_{15}O_6Ma)_n$ requires Ma, 8.0%; found Ma, 8.0. The properties of this salt resembled those of sodium alginate. For example, its solution in water was notably viscous and it gave insoluble precipitates with various polyvalent cations, including calcium, barium, cupric, lead, ferrous, nickel, cobalt, ferric and aluminum.

We claim:
1. A method of precipitating unwanted polyvalent cations selected from the group consisting of salts of calcium, barium, cupric, lead, ferrous, nickel, cobalt, ferric, sand and aluminum from aqueous solutions comprising adding to a said cation-containing solution an aqueous solution of poly(sodium 3-O-methacryloyl-D-gluconate).

References Cited
UNITED STATES PATENTS 3,235,490   2/1966   Goren _____ 210—52

MICHAEL E. ROGERS, *Primary Examiner.*

U.S. Cl. X.R.

252—180

UNITED STATES PATENT OFFICE

CERTIFICATE OF CORRECTION

Patent No. 3,433,738

March 18, 1969

William A. P. Black et al.

It is certified that error appears in the above identified patent and that said Letters Patent are hereby corrected as shown below:

Column 3, line 11, "sand" should be deleted.

Signed and sealed this 10th day of November 1970.

(SEAL)
Attest:

Edward M. Fletcher, Jr.
Attesting Officer

WILLIAM E. SCHUYLER, JR.
Commissioner of Patents